United States Patent [19]

Maruyama

[11] 4,332,428
[45] Jun. 1, 1982

[54] ROTARY MECHANISM WITH AXIAL BEARINGS

[75] Inventor: Teruo Maruyama, Neyagawa, Japan

[73] Assignee: Matsushita Electric Industrial Co., Ltd., Osaka, Japan

[21] Appl. No.: 109,491

[22] Filed: Jan. 4, 1980

[30] Foreign Application Priority Data

Jan. 16, 1979 [JP] Japan .................................. 54-3701
Mar. 14, 1979 [JP] Japan ................................ 54-30343
Jul. 31, 1979 [JP] Japan ................................ 54-98217

[51] Int. Cl.$^3$ ............................................. F16C 39/06
[52] U.S. Cl. ......................................... 308/10; 308/9; 308/170
[58] Field of Search .................... 308/9, 170, DIG. 1, 308/140, 146, 163, 172, 10

[56] References Cited

U.S. PATENT DOCUMENTS 4,209,207  6/1980  Schippers et al. .................. 308/170
4,210,371  7/1980  Gerkema et al. ....................... 308/9
4,220,379  9/1980  Pimiskern et al. ..................... 308/9

*Primary Examiner*—Lenard A. Footland
*Attorney, Agent, or Firm*—Burgess, Ryan and Wayne

[57] ABSTRACT

A rotary mechanism with axial bearings comprising a shaft having at least one free end, a housing rotatably fitted over said shaft with a lubricant being contained in the space defined between them, a first axial position control means for controlling the relative axial position between the shaft and the housing, the first axial position control means comprising a thrust axial bearing, which is referred to as "the micro-groove bearing" in the specification, comprising a projection extended from the free end of the shaft or its opposing bearing surface of the housing coaxially of the shaft and radial grooves formed in the face of the free end of the shaft or its opposing bearing surface of the housing in such a way that upon relative rotation between the shaft and housing, the pressure may be built-up in the oil film therebetween, whereby they may be separated from each other; and a second axial position control means which may buildup the pressure or may exert the force in such a direction that the clearance between the projection and its opposing bearing surface of the "micro-groove bearing" may be reduced or the free end of the shaft and the opposing surface of housing may be moved toward each other. The shaft or housing may be started and driven at low torques and the wear problems of bearings may be eliminated. Furthermore the relative position between the shaft and housing may be accurately maintained within an allowable tolerance range regardless of the position of the rotary mechanism.

8 Claims, 25 Drawing Figures

ROTARY MECHANISM WITH AXIAL BEARINGS

BACKGROUND OF THE INVENTION

The present invention relates to a rotary mechanism wherein a shaft having at least one free end and a housing rotatably fitted thereover are rotated relatively with respect to each other through contactless or axial bearings.

Employed as rotary head cylinder assemblies in video tape recording systems (to be referred to as "VTR" for brevity in this specification) are rotary mechanisms wherein a rotating member such as an upper cylinder is rotatably supported at one free end of a shaft, the other end of which is clamped, in point or line contact relationship with each other or wherein a rotating member is mounted on a shaft through anti-friction bearings such as ball or roller bearings. However such supporting or bearing systems as described above have their inherent problems. When the rotating member is supported at one end of the shaft in point contact relationship therewith, rapid wear of the bearing surfaces results, so that the relative position between the rotating member and the shaft changes. When the rotating member is supported at one end of the shaft in line contact relationship therewith, a high starting torque is needed because of a high resistance between the bearing surfaces. When the rotating member is supported on the shaft through the anti-friction bearings, the axial position of the rotating member relative to the shaft cannot be maintained accurately as will be described in more detail hereinafter.

SUMMARY OF THE INVENTION

The present invention has for its object to substantially overcome the above and other problems encountered when a rotating member is supported on a stationary member through the prior art bearings.

Briefly stated, to the above and other ends, the present invention provides a rotary mechanism employing axial bearing means comprising a shaft having at least one free end; a housing rotatably fitted over the shaft with a lubricant interposed therebetween; a first axial position control means for controlling the relative axial position between the shaft and the housing, the first axial position control means comprising a first thrust axial bearing, which will be referred to as "a micro-groove bearing" in this specification, said axial bearing comprising a projection extended from the free end of the shaft of its opposing bearing surface of the housing wall coaxially of the shaft and radial grooves formed in the end face of the projection or its opposing bearing surface in such a way that upon relative rotation between the shaft and the housing, pressure may be built-up in the oil film formed therebetween, whereby the bearing surfaces may be separated from each other; and a second axial position control means which may produce the pressure or may exert the force in such a direction that the bearing surfaces of the first thrust axial bearing or "micro-groove bearing" may be forced to move toward each other.

With the rotary mechanism of the present invention, the rotating member may be started and driven at low torques. The problems arising from the wear of bearing surfaces may be substantially alleviated. Furthermore the relative axial position between the rotating and stationary members may be accurately maintained regardless of the position of the rotary mechanism, whereby a desired distance or height of a predetermined point on the rotating member from a reference point or surface of the stationary member may be maintained with a higher degree of accuracy hitherto unattainable by the use of the prior art bearings.

The above and other objects, effects, features and advantages of the present invention will become more apparent from the following description of some preferred embodiments thereof taken in conjunction with the accompanying drawings.

DESCRIPTION OF THE PREFERRED EMBODIMENTS

Figure 1:
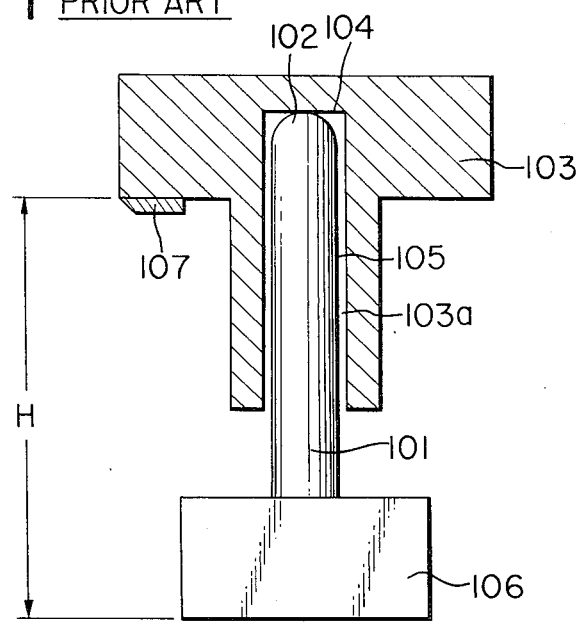
FIG. 1 shows a housing supported through a spherical pivot bearing on a shaft.
Figure 2:
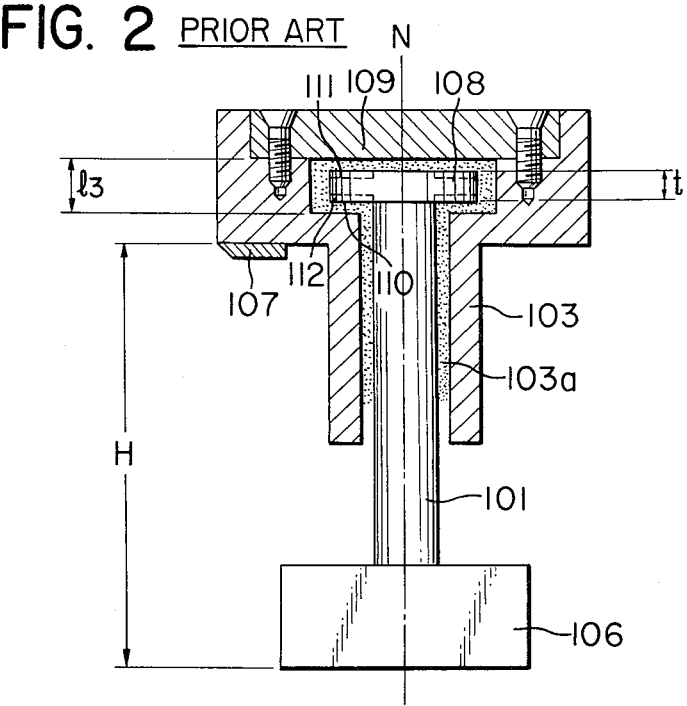
FIG. 2 shows a housing supported through axial or spiral-groove bearings on a shaft.

Prior Art, FIGS. 1 and 2

Prior to the description of preferred embodiments of the present invention, the prior art bearings related to the present invention will be described in detail in order to point out more specifically the problems thereof with reference to FIGS. 1 and 2.

First referring to FIG. 1, the prior art bearing which takes both the radial and axial load and controls the axial position of a housing 103 will be described. The bearing shown in FIG. 1 has the following advantages. (1) The weight of the housing 103 is normally exerted to an axial bearing (a semispherical upper end) 102 of a stationary shaft 101 securely mounted on a base 106 so that regardless of whether the housing 103 is rotating or at rest, the bottom surface of a cylindrical blind bore 103a of the housing 103 is pressed against the pivot bearing 102. The bottom surface and the pivot bearing 102 make a point contact so that the load of rotation is less and consequently the housing 103 may be started at a relatively small torque. (2) Means for controlling the axial position of the housing 103 is simple in construction and may be readily combined with a radial bearing 105, whereby the rotation at a higher degree of accuracy may be ensured.

However, when the prior art bearing of the type described above with reference to FIG. 1 has been applied to the portable VTR having an increasing tendency toward recording at a higher density and toward operation with higher accuracies, the following problems have arisen.

As a result of a long period of operation, the top of the pivot bearing 102, which is in normal contact with the bottom surface of the cylindrical bore 103a of the housing 103, is inevitably subjected to gradual wear. As a result of this wear, the position of a head 107, which is mounted on the housing or rotary cylinder in the case of a VTR, is lowered, so that the relative position between the head 107 and an adjacent tape varies. The effect of this position error becomes more severe as the tendency toward recording at higher density continues and as the tendency in design and construction of VTR is toward more convenient portability. For instance, in modern versions of such equipment the axial position error ($\delta$) must be within five microns.

In order to overcome this problem, there has been proposed an arrangement wherein a lubricating oil having an excellent boundary lubrication ability is used and the pivot bearing 102 and its contact or mating surface (that is, the bottom surface of the bore 103a) are made of materials having higher resistance to wear such as ceramic, hard metals, jewels and so on. However, from the standpoint of cost and mass production, such an arrangement has been found unsatisfactory in practice.

There has been proposed another countermeasure wherein the pivot bearing 102 contacts the bottom surface 104 which is now semiconical in vertical cross section, so that the bearing surfaces may be made into line contact with each other instead of point contact and consequently the contact pressure may be reduced. However, this countermeasure has also been found unsatisfactory because in view of fabrication and assembly of parts, it is difficult to attain a correct alignment between the axes of the stationary shaft 101 and housing 103, A further countermeasure has been proposed in which the upper end of the stationary shaft 101 is formed conical and received by an anti-friction bearing. However, this countermeasure has been also found not successful in practice because in addition to the problems countered in the pivot bearing of the type described above, the construction becomes very complicated.

In order to overcome the above and other problems encountered in the prior art, there has been proposed a spiral-groove bearing of the type shown in FIG. 2. That is, in order to maintain the contactless or full-film lubrication, both the upper and lower surfaces 109 and 110 of a flange 108 of a thrust bearing are formed with such grooves or the like 111 and 112, respectively, that the pressures produced or built-up in the films on the surfaces 109 and 110 may cause the housing 103 to float.

When the housing 103 is at rest, no oil film is formed, as is well known in the art, and therefore the housing 103 is so lowered that its mating or bearing surface is maintained in contact with the upper surface 109. As a result, a greater torque is required to start the housing 103. More particularly, when the bearing of the type shown in FIG. 2 is used to support the rotary cylinder (which corresponds to the housing 103 in FIG. 2) of a VTR driven by a small-size direct-drive motor, the rotary cylinder would not be started because of the insufficient power developed by the motor.

The axial position of the housing 103 is dependent upon the equilibrium between the weight of the housing 103 and the pressures built-up on the oil films between the upper and lower surfaces 109 and 110 on the one hand and their mating or bearing surfaces of the housing 103 on the other hand. However, the deviation in position of the housing results in the axial component of the weight of the housing 103 exerted to the stationary shaft 101, whereby the axial position of the housing 103 is deviated from its normal position. Consequently the height H of the head 107 mounted on the housing or rotary cylinder 103 varies; that is, the axial position error of the head occurs which adversely affects the recording and reproduction by the head 107. For instance, as described hereinbefore, the recent tendency in design and construction of VTR requires that the axial position error must be within as small as two microns.

First Embodiment, FIGS. 3 through 6

Figure 3:
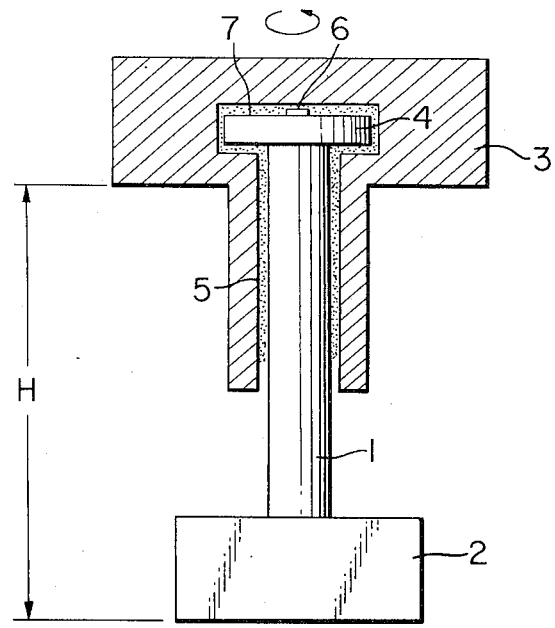
FIG. 3 shows the fundamental construction of a rotary mechanism in accordance with the present invention.

In FIG. 3 is shown the fundamental construction of a first embodiment of the present invention comprising a stationary shaft 1 mounted on a base 2, a housing 3 rotatably mounted on the stationary shaft 1 whose upper end is radially outwardly extended as a flange 4, and an oil 5 contained in the space between the stationary shaft 1 including its flange 4 and the housing 3.

An axial position control means 6 which will be referred to as "a micro-groove bearing or projection" in this specification and will be described in detail hereinafter, is extended from the upper surface or face 7 of the flange or flanged upper end 4 of the stationary shaft 1. A second axial position control means or a step bearing 8 is formed in the lower surface of the flange 4 (See FIG. 4).

Figure 4:
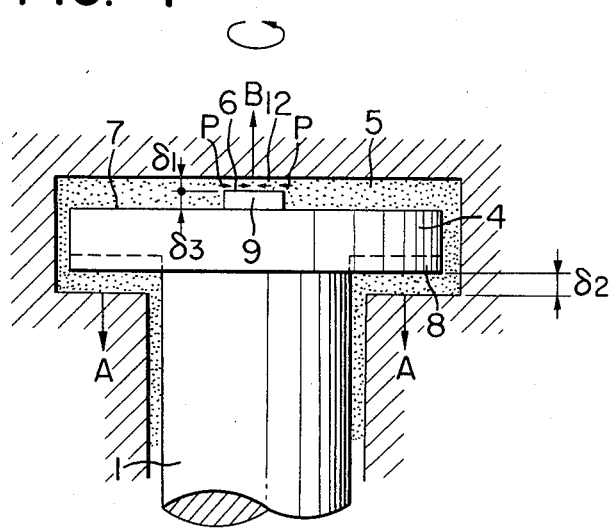
FIG. 4 is a fragmentary view, on enlarged scale, thereof.

Referring particularly to FIG. 4, the micro-groove projection 6 comprises a projection 9 extended from the flat upper surface 7 of the flange 4 and formed with spiral grooves. The clearance ($\delta_2$) is defined as the spacing between the step bearing 8 and its opposing or bearing surface while the clearance ($\delta_3$) is defined as the height of the projection 9 above the upper surface 7 of the flange 4.

In FIG. 5 (and in FIG. 8 as well), the dark areas show the grooves. As shown in FIG. 5B, the step or thrust bearing 8 is formed with lands 10 and recesses 11 which are alternated and are equiangularly spaced apart from each other.

As described above, the first embodiment is provided with the first axial position control means or the micro-groove projection or bearing 6 and the second axial position control means or the thrust or step bearing 8. The mode of operation thereof is as follows.

(1) First axial position control means or Micro-groove projection or bearing 6:

The spiral groove 6a is so oriented that when the housing 3 rotates in the clockwise direction, pressure may be built-up from the perimeter to the center as indicated by the arrows P in FIG. 4 by both the pumping effect and the wedge effect attainable with the spiral grooves 6a. The diameter (d) of the projection 9 or the micro-groove bearing or projection 6 is very small so that the effective axial bearing surface area is small. As a result, the pressure (P) built-up responds very sensitively to the variation in gap ($\delta_1$) as shown in FIG. 5C.

(2) Second axial position control means or Thrust or Step bearing 8:

Due to the wedge effect, the step bearing 8 builds up pressure as the housing 3 rotates. The pressure is positive at the inner or reduced end of each groove 11, but is negative at the outer or enlarged end. The absolute value of the negative pressure is lower than that of the positive pressure, so that a net positive load bearing pressure may be obtained. Since the step bearing 8 has a relatively large diameter ($D_1$) as shown in FIG. 5B, the pressure built-up responds relatively gently as indicated in FIG. 5D in response to the variation in clearance ($\delta_2$).

The pressure built-up by the step bearing 8 as well as the weight W of the housing 3 causes the housing 3 to move downwards as indicated by the arrows A in FIG. 4, but the pressure built-up by the micro-groove projection or bearing 6 serves to cause the housing 3 to float in the direction indicated by the arrow B in FIG. 4. As a result, the absolute height (H) indicated in FIG. 3 is dependent upon the equilibrium between the weight (W) of the housing 3 and the pressures built-up by both the micro-groove and step bearings 6 and 8.

The effects and features of the first embodiment may be summarized as follows:

(I) Low torque is required to start the housing:

When the housing 3 is at rest, there is no oil film between the step bearing 8 and its mating or opposing surface. As a result, the housing 3 is lowered so that the bearing or top surface of the micro-groove bearing 6 and the opposing or bearing surface 12 are in intimate contact with each other. In order to start a vertical moving member which is at rest and is in contact with a thrust bearing, a relatively greater torque is needed, but according to the first embodiment, the area of contact between the bearing surfaces between the micro-groove bearing 6 and the opposing bearing surface 12 of the housing 3 is very small as the diameter (d) is small as described elsewhere. In addition, the micro-groove bearing or projection 6 is extended at the center of the flanged upper end 4 of the stationary shaft 1. Thus, because of its small size and position, the micro-groove projection or bearing 6 provides a very small startup load so that only a small torque is needed to start the housing 3. Therefore it follows that the contactless micro-groove bearing in accordance with the present invention may be considered as a pivot or knife-edge bearing with an extremely sharp or pointed edge.

(II) Minimum wear because of contactless bearing:

The spiral grooves 6a of the micro-groove bearing 6 forms an oil film which is extremely thin but is very effective in maintaining the contactless bearing of the housing 3 during its rotation. As a consequence, even after a long period of operation, the wear of the contactless micro-groove bearing 6 may be by far minimized as compared with the pivot bearing 102 shown in FIG. 1.

Even though the oil film formed by the micro-groove projection or bearing 6 is extremely thin, it is very effective in maintaining the desired contactless bearing as described immediately above, so that it is not required to use the upper surface 7 of the flange 4 of the stationary shaft 1 in order to take the thrust load. As a result, the hight ($\delta_3$) of the micro-groove bearing or projection 6 may be increased to a greater extent so that a sufficient amount of lubricating oil 5 may be contained around the micro-groove bearing or projection 6. As a result, optimum lubrication may be attained.

(III) Ability of controlling the axial position or height of the housing or rotating member with a higher degree of accuracy:

One of the outstanding features of the first embodiment described above with reference to FIGS. 3 and 4 resides in the fact that two axial bearings are combined which are widely different from each other in bearing surface area; that is, in the pressure built-up vs. clearance characteristics (See FIGS. 5C and 5D). As a result, the variation in equilibrium position due to the change in position of the bearing assembly; that is, the variation in height (H) of the housing 3 may be minimized.

In should be noted that as shown in FIG. 5C, the pressure built-up by the micro-groove projection or bearing 6 is high only when the clearance ($\delta_1$) is small and declines very gently when the clearance exceeds a certain point. On the other hand, the variation in pressure built-up by the step bearing 8 is very gentle over the wide range of clearance ($\delta_2$) as shown in FIG. 5D. Therefore when the clearance ($\delta_1$) increases as the housing 8 is further floated upwards from an equilibrium position, the variation in the pressure built-up by the step or thrust bearing 8 is negligible, but the pressure built-up by the micro-groove bearing or projection 6 drops abruptly to a negligible level so that the housing 3 is caused to move down towards the equilibrium point or position.

On the other hand, when the clearance ($\delta_1$) decreases, the pressure built-up by the micro-groove bearing or projection 6 rises abruptly as shown in FIG. 5C, so that the housing 3 is caused to float upwards toward the equilibrium position or point.

That is, the pressure built-up by the micro-groove bearing or projection 6 responds very sharply in response to the variation in clearance ($\delta_1$) within the range indicated by $\Delta H$ in FIG. 5C. Therefore the range $\Delta H$ is selected depending upon a desired allowance in position error or an allowable deviation from the reference height H of the housing 3 and the configurations and dimensions of the spiral grooves 6a of the micro-groove projection or bearing 6 are so determined that the clearance or float ($\delta_1$) of the housing 3 above the micro-groove projection or bearing 6

$$\delta_1 < \Delta H$$

Furthermore, the adjustments after assembly are very simple. For instance, it suffices only to correctly adjust the height or distance between a reference flat surface and a reference point on the housing 3 or a rotary member at rest. The reason is that when the housing 3 is rotating, it will not float above the allowable error $\Delta H$.

Figure 6:
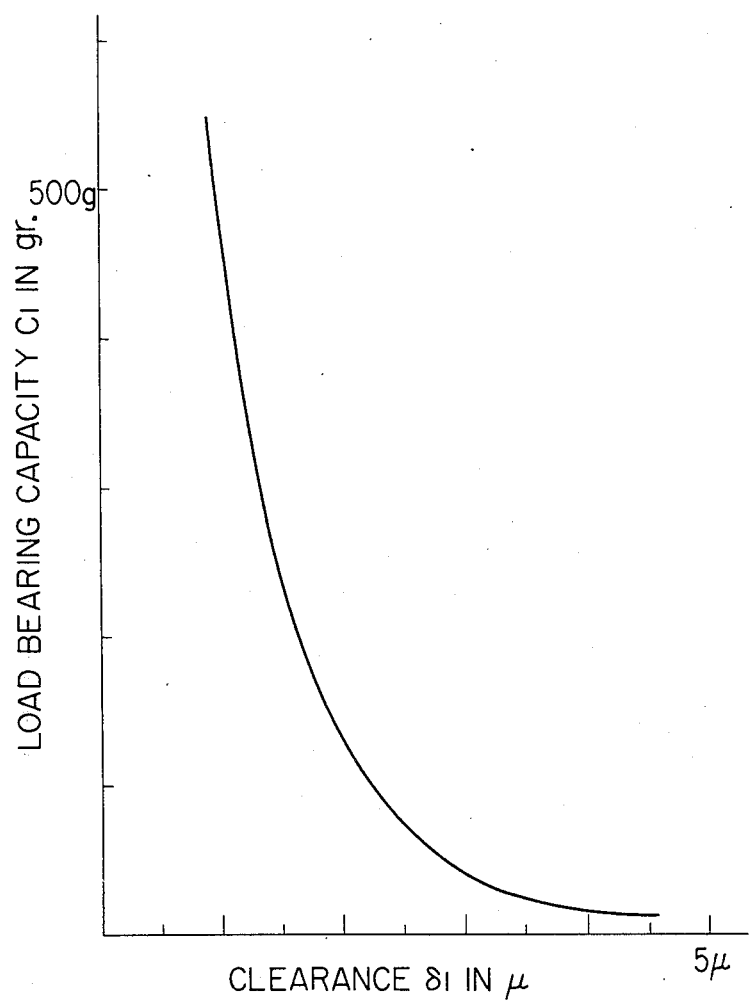
FIG. 6 shows the axial-load-clearance characteristic of the first thrust bearing used in the tests conducted by the same inventors.

The effects and features of the first embodiment will become more clear from the data obtained from the tests on the VTR cylinder incorporating the first embodiment of the present invention. FIG. 6 shows the characteristic curve between the load $C_1$ and the clearance or float ($\delta_1$) above the micro-groove projection or bearing 6 when the rotational speed is 1800 r.p.m. and the lubricant used has a viscosity of 15 cst. Further test data are shown in Table 1 below.

| parameters | symbol | |
|---|---|---|
| diameter of micro-groove bearing 6 | d | 3 mm |
| depth of spiral grooves | $h_o$ | 4 $\mu$ |
| angle of spiral grooves | $\alpha$ | 16° |
| number of spiral grooves | n | 4 |
| diameter of flange 4 | $D_1$ | 12 mm |

The step bearing 8 was so designed and constructed that the load $C_2$ is 300 grams when the clearance ($\delta_2$) is 15 microns. The rotary member (or the housing 3) was 250 grams. At the vertical position, therefore, the overall load (W+$C_2$=550 grams) is in equilibrium with the pressure produced by the micro-groove projection or bearing 6. The clearance or float ($\delta_1$) is about 0.9 microns. The tests confirmed that the height of the VTR cylinder (housing 3) varies only within the allowable error range (3 microns).

In addition, the starting torque is so low that the power provided by the direct-drive motor incorporated in the portable VTR is sufficient to start and drive the cylinder very smoothly.

The micro-grooves 6a of the micro-groove projection or bearing 6 may be formed by a photo-etching process wherein the pattern of micro-grooves 6a at enlarged magnification is reduced to the final dimensions desired.

Second Embodiment, FIG. 7

Figure 7A:
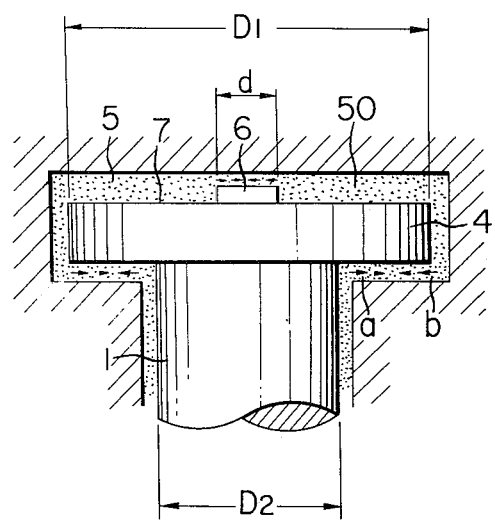
FIG. 7A is a fragmentary and diagrammatic view of a second embodiment of the present invention.
Figure 7B:
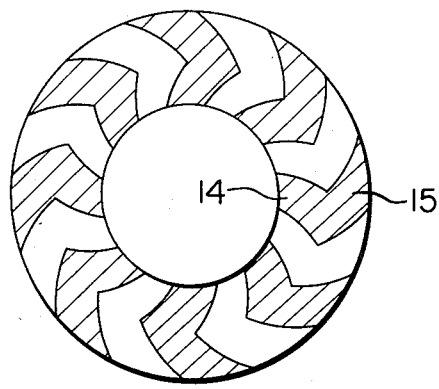
FIG. 7B is a top view of a herringbone spiral-groove bearing used therein.

In FIG. 7A is shown the second embodiment of the present invention which is substantially similar in construction to the first embodiment described above except that the second axial position control means comprises a spiral groove bearing as shown in FIG. 7B, which will be referred to as "a herringbone spiral-groove bearing" hereinafter in this specification. Each groove consists of an inner spiral groove portion or backwardly curved groove portion 14 and an outer spiral groove portion or forwardly curved groove portion 15 contiguous with the backwardly curved groove portion 14. Therefore, the backwardly curved groove portions 14 serve to force the lubrication oil 5 radially outwardly while the forwardly curved groove portions 15 serve to force the lubricating oil 5 radially inwardly as indicated by the arrows (a) and (b), respectively, in FIG. 7A. The herringbone spiral-groove bearing of the second embodiment is advantageous over the step bearing 8 of the first embodiment in that even when the diameter $D_1$ of the flange 4 of the stationary shaft 1 is small, a relatively large load bearing pressure may be built-up.

The following three spiral groove patterns may be used in the second embodiment.

(A) The pattern of spiral grooves which serves to force the lubricating oil 5 radially outwardly as indicated by the arrow (a) in FIG. 7A.

(B) The pattern of spiral grooves which serves to force the lubricating oil radially inwardly as indicated by the arrow (b).

(C) The herringbone spiral groove patterns or combinations of of the patterns (A) and (B) such as shown in FIG. 7B. When these spiral groove patterns are employed, the following points must be taken into consideration because according to the present invention, the first and second axial position control means are spaced axially apart from each other by a relatively close distance. That is, the flange 4 is securely attached to the free or upper end of the stationary shaft 1 and the first axial position control means or the micro-groove projection or bearing 6 is extended from the upper surface 7 thereof while the second axial position control means or the thrust bearing 8 has its spiral grooves formed in the lower surface thereof.

(A) The lubricating oil 5 is forced to flow into the oil reservoir 50 defined between the upper surface 7 of the flange 4 and the opposing wall surfaces of the housing 3. As a result, the pressure above the flange 4 increases. The area of the lower surface of the flange 4 is smaller than that of the upper surface 7 including the micro-groove projection or bearing 6 by a degree depending upon the diameter $D_2$ of the shaft 1. As a consequence, there is a difference between pressure acting upon the upper surface 7 and the pressure acting upon the lower surface of the flange 4 so that the housing 3 is caused to float upwards (in the direction indicated by the arrow B in FIG. 4) depending upon the pressure difference. When the bearing assembly is maintained in horizontal position with the stationary shaft 1 extending horizontally, the weight of the housing 3 will not exert any effect on the equilibrium between the pressures acting on both sides of the flange 4. As a result, the axial position of the housing 3 is dependent solely on the pressure difference across the flange 4.

(B) In this case, the lubricating oil 5 in the oil reservoir 50 is forced to flow radially outwardly. When the pumping effect of the second axial position control means or lower thrust bearing is excessive, the effect of the micro-groove projection or bearing 6 which separates or floats the housing 3 with an extremely thin oil film will be adversely affected. In an extreme case, the lubricating oil 5 is exhausted out of the reservoir 50 and in the worst case the direct contact between the micro-groove projection or bearing 9 and its opposing bearing surface results.

(C) When the second axial position control means is formed with the herringbone spiral groove pattern as shown in FIG. 7B so that the lubricating oils which are forced to flow radially inwardly and outwardly, respectively, are balanced in volume, the unidirectional flow of the lubricating oil 5 into or out of the reservoir 50 may be avoided so that the problems when the pattern (A) or (B) is employed may be overcome.

The use of the step bearing of the type shown in FIG. 5B also will not cause any radial flow of the lubricating oil so that the containment of the lubricating oil in the reservoir 50 may be ensured and the adverse effect on the pressure equilibrium across the flange 4 may be avoided.

The herringbone spiral groove bearing of the second embodiment is advantageous over the step bearing 8 of the first embodiment in that the former has a load bearing capacity per unit area of the bearing surface which is higher than the latter. As a result, the diameter of the flange and hence the diameter of the bearing assembly may be reduced and the clearance may be increased so that the housing 3 may be started and driven at a low torque.

In the second embodiment, instead of forming the pattern of spiral grooves 14 and 15 in the undersurface of the flange 4, it may be formed in the opposing bearing surface of the housing 3.

Referring back to FIG. 5A, when the micro-groove pattern 6A of the micro-groove bearing 6 is such that the lubricating oil is forced to flow radially inwardly, a high load bearing capacity may be obtained even when the diameter of the micro-groove bearing or projection 9 is small.

In general, the driving torque of a spiral groove bearing with the pressure built-up from the perimeter to the center may be expressed by $$T_1 = f_1 \omega^2 \frac{(R_o^4 - R_i^4)}{\delta} \quad (1)$$

where $f_1$ is a constant of proportionality determined by the configuration of the groove (that is, the spiral angle, the number of grooves, the depth of the grooves and so on);
$\omega$ is the angular velocity;
$R_o$ is the outer radius of the bearing;
$R_i$ is the inner radius of the bearing; and
$\delta$ is the clearance.

Even though the clearance which is equal to one to two microns in the first or second embodiment, the outer diameter $R_o$ may be reduced so that the starting and driving torques may be reduced as described above, which is very advantageous when the present invention is applied to portable VTRs with a built-in battery source.

Figure 8A:
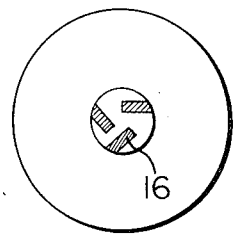
FIGS. 8A, 8B and 8C show variations of the micro-groove pattern employed in the micro-groove bearing in accordance with the present invention.

Instead of the spiral grooves, the straight grooves as shown in FIG. 8A may be used which are so arranged as to force the lubricating oil or the like to flow radially inwardly.

Figure 8B:
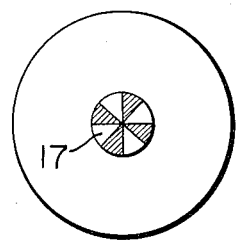
Figure 8C:
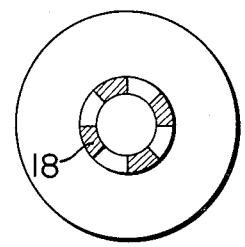

Alternatively, when the weight of the housing 3 is not so heavy that it suffices to provide a low load bearing capacity, the present invention may use a step bearing of the type shown in FIG. 8B. That is, this step bearing has the grooves each of which has its gap changed circumferentially in stepwise fashion. Or a step bearing having a large diameter as shown in FIG. 8C may be used, the load bearing capacity being proportional to the outer diameter of the step bearing.

In the first and second embodiments, the projection 9 of the micro-groove bearing 6 is shown as being cylindrical so that the clearance between the grooved or top surface of the projection 9 and the upper surface 7 of the flange 4 on the one hand and the opposing bearing surface of the housing 3 abruptly changes at the perimeter of the micro-groove bearing 6. Instead, the projection 9 may be frustoconical so that the clearance may change gradually or gently.

Figure 9:
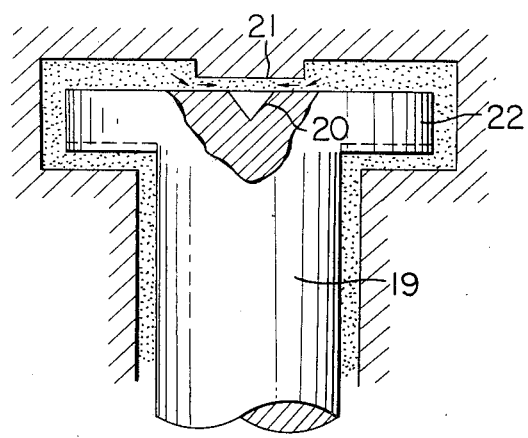
FIG. 9 is a schematic view of a modification of the first embodiment shown in FIG. 4.

Instead of extending the projection from the upper surface 7 of the flange 22, a projection 21 may be extended from the opposing bearing surface of the housing 3 and the pattern of micro-grooves may be formed in the lower end face of the projection 21 or in the upper surface of the flange 22 as shown in FIG. 9.

Since the pressure distribution created by the pattern of spiral grooves is dependent upon the effective area of the spiral groove pattern, the outer diameter of the spiral groove pattern may be made equal to that of the projection 9 or 21.

Referring back to FIG. 4, the pattern of spiral grooves may be formed in the opposing bearing surface 12 of the housing 3 and may have an exterior diameter greater than that of the projection 9 whose upper end surface is flat. The load bearing capacity of the micro-groove pattern is dependent upon the outer diameter of the projection 9.

In a bearing having a pattern of spiral grooves which are so arranged as to force the lubricating oil radially inwardly or outwardly, the load bearing capacity may be expressed by $$F = f_2 \omega \frac{(R_o^4 - R_i^4)}{\delta^2} \quad (2)$$

where $f_2$ is a constant of proportionality determined by the configurations of grooves (that is, the spiral angle, the number and depth of spiral grooves and so on).

Figure 5A:
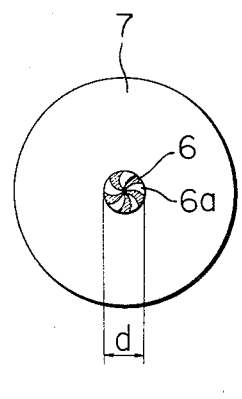
FIG. 5A is a top view a first axial position control means or a first thrust bearing thereof.
Figure 5B:
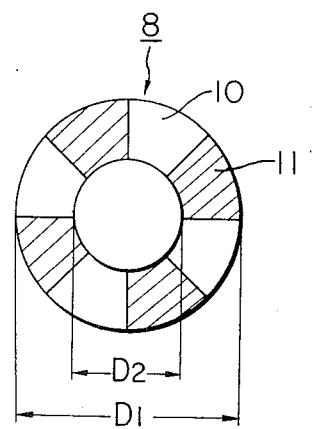
FIG. 5B is a top view of a second axial control means or a second thrust spiral-groove bearing thereof.
Figure 5C:
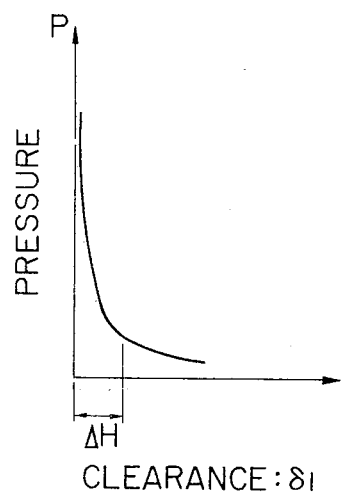
FIG. 5C shows the pressure-clearance characteristic of the thrust bearing shown in FIG. 5A.
Figure 5D:
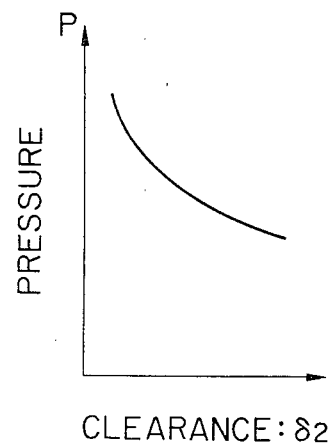
FIG. 5D shows the pressure-clearance charateristic of the thrust bearing shown in FIG. 5B.

For instance, in the first embodiment, the inner diameter $R_i$ is zero ($R_i=0$) as shown in FIG. 5A. In general, the load bearing capacity will not be adversely affected even when there is no groove or any other means at the center of the micro-groove pattern 6a which contributes to the pressure buildup. Therefore, in case of machining, a center hole 20 may be drilled as shown in FIG. 9. For instance, the ratio in load bearing capacity between the micro-groove bearing with $R_i$ (the radius of the center hole 20) equal to 1 mm, $R_o$ equal to 2 mm and the micro-groove bearing with $R_i$ equal to 0 mm and $R_o$ equal to 2 mm is of the order of $\frac{7}{8}$.

In general, the smaller the diameter of the micro-groove pattern, the more sensitive the pressure buildup response to the variation in clearance becomes. However, if it is difficult to reduce the diameter, the same effect may be attained by depending the depth of the spiral grooves 6A.

Instead of the spiral groove bearings of cylindrical and frustoconical design, those of a spherical and conical design may be also used.

Figure 10:
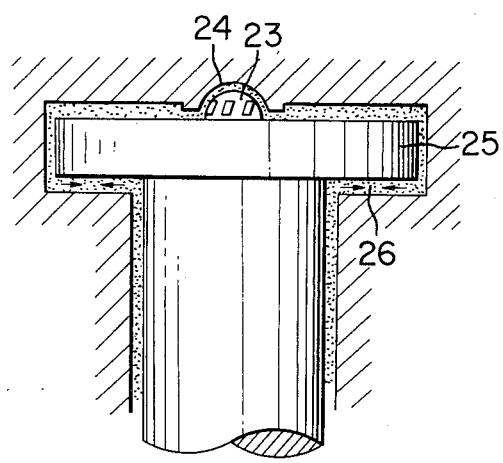

Referring to FIG. 10, a semispherical projection 23 is extended from a flange 25 and formed with a plurality of equiangularly spaced apart spiral grooves. The grooved spherical projection 23 is fitted into a semispherical recess or housing 24 formed in the opposing surface of the housing 3. The undersurface of the flange 25 is formed with a plurality of equiangularly spaced spiral grooves of the type described with reference to FIG. 7B.

Figure 11:
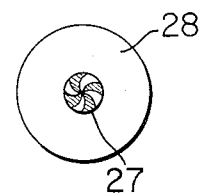
FIGS. 10, 11 and 12 are schematic longitudinal sectional views, respectively, of modifications of the first embodiment shown in FIG. 4.
Figure 12:
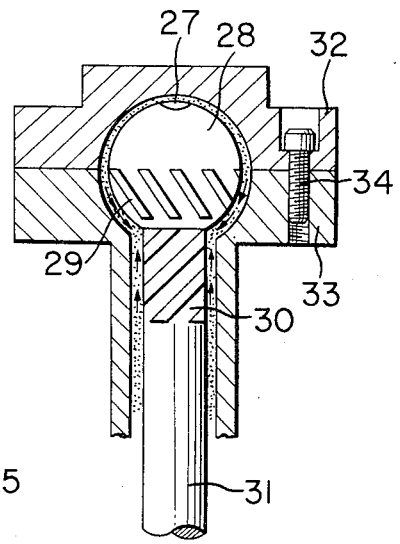

Referring to FIGS. 11 and 12, a pattern of micro-grooves 27 is formed at the top of the spherical end 28 of a shaft 31 and a plurality of spiral grooves 29 are formed in the lower half of the spherical end 28, whereby the micro-groove bearing and the spiral-groove bearing of the spherical design are provided. The shaft 31 is also provided with a radial spiral-groove bearing 30 adjacent to the spherical end 28. The shaft 31 is extended through the sleeve portion extended downwards from a lower block 33 which is securely joined with a bolt 34 to an upper block 32 so as to define a chamber in which is housed the spherical end 28 of the shaft 31.

The spiral-groove bearing 29 of the semispherical design may take both the radial and axial loads. That is, it cooperates with the micro-groove bearing 27 so as to take the axial load while cooperating with the radial spiral-groove bearing 30 so as to take the radial load.

Figure 13:
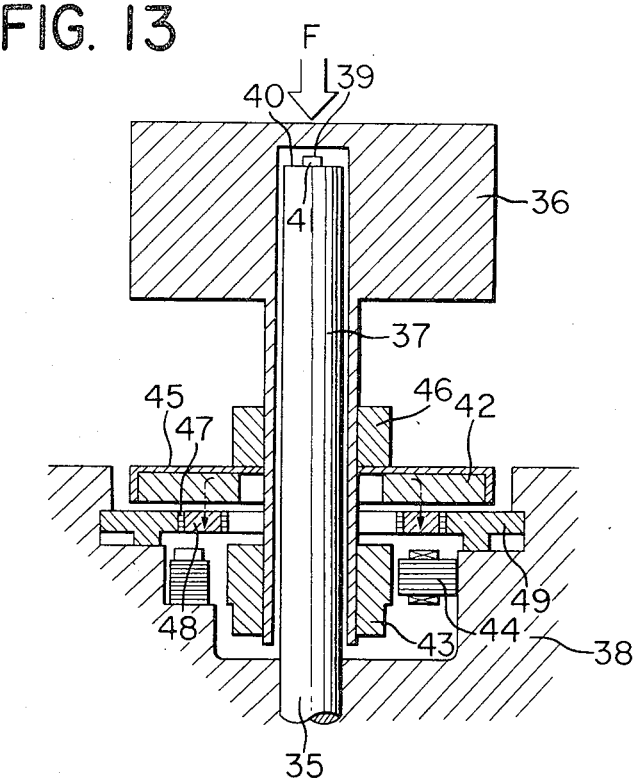
FIG. 13 is a schematic longitudinal sectional view of a third embodiment of the present invention.

Third Embodiment, FIG. 13

In the third embodiment shown in FIG. 13 the attractive force exerted by a direct-drive motor and the pressure built-up in the thin film formed by a axial bearing of a very small diameter are balanced.

Numeral 35 is a stationary shaft; 36, a housing rotatably mounted on the stationary shaft 35; 37, a radial bearing; 38, a base upon which is mounted the stationary shaft 38; 39, a micro-groove pattern; and 40, an upper end face of the stationary shaft 35.

The upper end face 40 is flat and a projection 41 of a very small diameter is extended coaxially of the shaft 35 and the micro-groove pattern 39 is formed in the upper end face of the projection 41. Numeral 42 is an armature magnet of a direct-drive motor; 43, a position rotor; 44, a position stator; 45, a magnet case; 46, a bushing; 47, an armature coil; 48, a core; and 49, a retainer.

The third embodiment utilizes as the second axial position control means the attractive forces of the magnets of the direct-drive motor. Since the thrust axial bearing is not used as the second axial position control means, the flange 4 may be eliminated and the following effects and features may be attained.

The pressure built-up by the micro-groove bearing 39 causes the housing 36 to float upwards. As described elsewhere, the armature magnet 42 comprises a plurality of magnets which are different in the magnetized directions but are magnetized in the axial direction, so that the armature magnet 42 is always attracted by the core 48. As a result, the housing 36, which is securely joined to the armature magnet 45, is attracted normally downwards (in the direction indicated by the arrow F). Therefore, the housing 36 floats at the point where the attractive force and the positive pressure built-up by the micro-groove pattern 39 are balanced.

The attractive force is inversely proportional to the air gap between the magnet 42 and the core 48. As compared with the high sensitivity of the variation in pressure built-up in response to the variation in clearance (See FIG. 5C) of the micro-groove pattern 39, the variation in attractive force in response to the variation in air gap is small. As a result, as with the case of using the thrust bearing having a large effective bearing surface, the rotary device may be obtained which may substantially eliminate position errors.

In addition, the third embodiment has the same effects and advantages as those of the first embodiment (See FIG. 1) of the pivot bearing construction.

Furthermore, the construction is very simple. The rotary device may be assembled only by inserting the housing 3 from the upper end of the stationary shaft.

If required, the rotary device may be so designed and constructed that the housing 36 may be removed from the stationary member 38 even after the assembly.

Next, the application of the axial bearing assembly in accordance with the present invention to the rotary head assembly of VTR will be described in detail below.

According to the present invention, there may be provided a portable VTR in which the head may be located at a correct position by a simple assembling step; a minimum position error may be ensured; only a low torque may be needed; and the height of the head may be maintained at a higher degree of accuracy even after a long period of operation.

The mechanism, especially the rotary head cylinder of the VTR, must satisfy the following requirements:

1. Variation in rotational speed must be minimized.
2. Transverse vibrations or run-out must be eliminated or minimized.

In order to distinctly and specifically point out the effects and features of the present invention when applied to the VTR rotary head cylinder, a prior art VTR cylinder will be described below with reference to FIG. 14. A rotary head cylinder or an upper cylinder 201 is in general rotated 1800 r.p.m. in the case of the two-head helical scanning type VTR. A head 202 is mounted on the upper cylinder 201. A rotary shaft 203 is supported by radial bearings 204 and 205. A bushing 206 is fitted over the rotary shaft 203 and the upper cylinder 201 is mounted on the bushing 206. Sleeves 207, 208 and 209 are fitted over the rotary shaft 203 and pre-loaded so that the axial movement of the bearings 204 and 205 may be prevented.

Numeral 211 is a rotary transformer mounted on the bushing 206 or the rotating member; 212, a rotary transformer mounted on a stationary member; 213, a ring for mounting the rotary transformer; and 214, a retainer.

The VTR rotary head cylinder of the type wherein the rotary shaft 203 is supported by the anti-friction or roll bearings 204 and 205 as described above has many difficult problems to be solved in order to attain the objects not only of increasing the recording time by increasing the recording density but also of providing a portable VTR by making the mechanisms compact in size.

For instance, because of the unsatisfactory sphericity of the balls, the dimensional errors of the rolling contact surfaces of the outer and inner races, vibrations caused by the elasticity of the outer and inner races and the plays between the mating members, which are all inherent to the ball bearings, the accuracy of a rotating member, which is supported by the ball bearings, cannot be improved over some extent.

In order to overcome the problems encountered when the ball bearings or the like are employed, there has been proposed to use the axial bearings, but they have also some problems as will be described below.

Home-use electronic equipment such as VTR must be compact in size and mass produced at low costs. The rotary head cylinders for industrial VTR which employ the pneumatic bearings have been devised and used. However, they need a compressor as a source of air under pressure and very complex pneumatic control circuits so that their application to home-use VTR is very difficult.

In addition, there has been an increasing demand for portable VTR, but the height of VTR is limited by the height of the rotary head cylinder. In order to make home-use portable VTR more compact in size, the rotary head cylinder itself must be made very compact in size.

A further requirement imposed on the bearings used in home-use VTR is the complete seal or containment of lubricating oil. That is, the lubricating oils used in the machine tools or the like may be supplemented or exchanged at any time, but the lubricating oil used in the axial bearings in the rotary head cylinder in home-use VTR must be completely sealed.

A still further requirement is that the rotation with a high degree of accuracy that is, the rotation free from variation in rotational speed and from run-out of the rotary head cylinder must be maintained for a long period of operation.

Another requirement is that the rotation of the rotary head cylinder must not be adversely affected by the position of VTR, especially of portable VTR. Furthermore, the rotary head cylinder must be started and driven at low torques.

The present invention substantially overcomes the above and other problems encountered in the prior art axial bearings, especially the problems encountered when the VTR rotary cylinders are assembled and the problems of means for taking the thrust load.

One of the most difficult problems is that in the assembly of rotary head cylinders, it is very difficult to adjust the axial position of the head. This problem has been also encountered in the rotary head cylinders of the type wherein the rotatary shaft is supported by the ball bearings as described above. This problem has attracted much attention in the recent trend toward the automatic and high-speed assembly.

Referring back to FIG. 14, when the ball bearings 204 and 205 are used, it is very difficult to maintain the axial position (the height H relative to a reference surface S) of the head 202 with a higher degree of accuracy in assembly. The reason is as follows. In order to eliminate the plays in the axial direction of the two ball bearings 204 and 205, they must be pre-loaded in an axial direction. Then the mounting surface T of the upper cylinder 201 is displaced so that the position of the head 202 relative to the reference surface S is displaced. In order to solve this problem, after the rotary head cylinder has been assembled, the mounting surface T of the upper cylinder 201 must be machined or otherwise finished again.

When the axial bearings are used in the VTR rotary head cylinders, the following problems arise because of the inherent problems or underlying principle of the axial bearings.

Referring back to FIG. 2, the spiral grooves or the like are formed in both the major surfaces of a flange 108 so that the latter may be floated by the pressure built-up both above and below the flange 108 by the spiral grooves or the like. This construction is well known in the art. The inventors made extensive studies and experiments of such a axial bearing as shown in FIG. 2.

Figure 14:
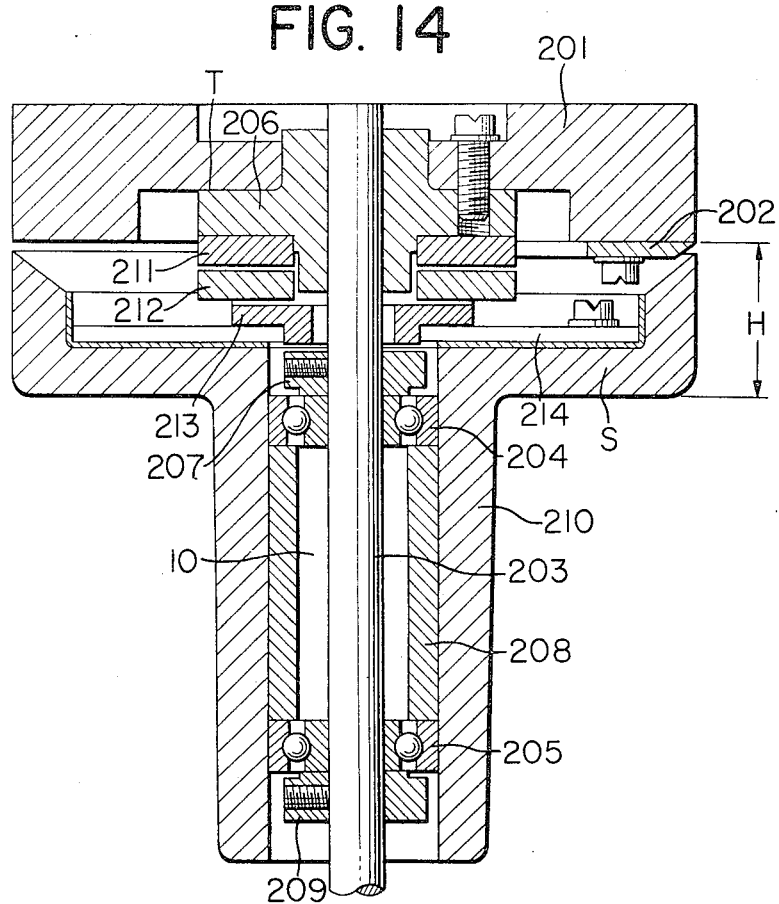
FIG. 14 is a schematic longitudinal sectional view of a prior art VTR rotary head cylinder assembly of the type wherein ball bearings are used.

Opposed to the rotary head cylinder utilizing the ball bearings as shown in FIG. 14, the housing 103, which is fitted over the stationary shaft 101, may be maintained accurately both in the axial and radial position only when the housing 101 is rotating. As a result, it is difficult to maintain or determine the position (H) of the head 102 during the assembly when the housing 103 is not rotating.

Because of the dimensional tolerances in the case of the mass production of parts, the clearances above and below the flange 108 are tens of microns. In an assembly when the housing 103 is not rotating, the height H of the head 107 may be estimated based on the estimation of the thickness of the oil films built-up both on the upper and lower surfaces of the flange 108. However, it is extremely difficult to limit the deviation of the height of the head 107 within two microns when the housing 103 is rotating. The reason is as follows. Because of the dimensional errors of the depth of the grooves formed in both the upper and lower surfaces of the flange 108, the spiral-groove bearings 111 and 112 have the pressure-clearance characteristics (See FIG. 5C) which vary more or less from one bearing to another.

In addition, when the ambient temperature changes, the viscosity of the lubricating oil used also changes, so that the pressure built-up in the oil film also changes. As a result, the equilibrium position of the flange 108 changes so that the axial position (H) of the head 107 changes.

Furthermore, a high starting torque is needed and the axial position of the head 107 is deviated when the position of the rotary head cylinder is changed as described elsewhere.

Referring back to FIG. 1, when the housing 103 is supported by the pivot bearing 102, the wear of the contact surfaces results in the change in position of the head 107 over a long period of operation as described elsewhere.

As described above, the present invention has for its object to overcome the above and other problems encountered in the VTR rotary head cylinder wherein the axial bearings are used instead of the ball bearings.

The above and other objects of the present invention are attained by the arrangement in which a sleeve upon which is mounted a rotary cylinder is fitted over a center shaft whose one end is clamped to a base, thereby providing a axial bearing; and a micro-groove bearing of the type described hereinbefore is provided at the relatively moving surface at the upper end of the center shaft so that the rotating member may be floated by the pressure built-up in the oil film of small size, whereby the assembly may be facilitated, the position error of the head may be eliminated, the starting torque may be decreased and the wear of mating surfaces may be eliminated.

The present invention will become more apparent from the following description of the preferred embodiments thereof taken in conjunction with the accompanying drawings.

Figure 15:
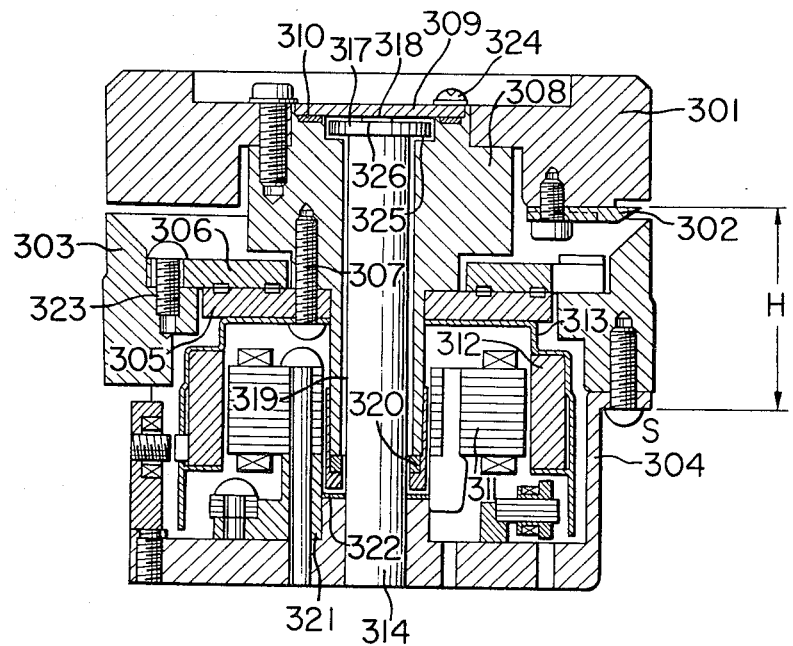
FIG. 15 is a schematic longitudinal sectional view of a fourth embodiment of the present invention which is incorporated in a VTR rotary head cylinder assembly.

Fourth Embodiment, FIG. 15

In the fourth embodiment shown in FIG. 15, the reference numeral 301 denotes an upper cylinder which is a rotary head member; 302, a head attached to the upper cylinder; 303, a lower cylinder securely attached to a lower housing 304 which is a base.

Numerals 305 and 306 are rotary transformers mounted on the rotating and stationary members, respectively, so that the signal derived from the head 302 may be transmitted from the rotating member to the stationary member in a contactless manner. Numeral 305 is mounted with a bolt 323 to a rotary sleeve 308 while the rotary transformer 306 is mounted with a bolt 323 to the lower cylinder 303.

A rotary sleeve 308, which is the sleeve as described above, securely holds the upper cylinder 301 in such a manner that the cylinder 301 may be removed in the upward direction from the rotary head cylinder assembly. Numeral 309 is an upper cover which is attached with a bolt 324 to the upper end of the rotary sleeve 308 through an oil seal 310 in order to prevent the leakage of a lubricating oil. Numerals 311, 312 and 313 designate a stator, a rotor magnet and a magnet housing of a direct-drive motor which imparts the rotating power to the rotary member of the rotary head cylinder assembly of the present invention.

The upper cylinder 301, the rotary sleeve 308, the rotary transformer 305, the magnet housing 313 and the rotor magnet 312 constitute a major rotating member.

A center shaft 314 which is mounted on the lower housing 304, is formed with spiral grooves 315 and 316 which are a kind of non-true-circle bearings and are so arranged as to prevent oil whirl, which is a phenomenon inherent to the axial bearings.

Numeral 317 is a flange extended from the free end of the center shaft 314; and 318 is a micro-groove bearing which is a first thrust bearing and is formed in the upper surface of the flange 317 coaxially thereof. The flange 317 is made of a steel (SK4). The micro-groove bearing 318 a well as its opposing bearing surface are hardened.

A magnetic fluid 319, which is a lubricant, is completely filled in the space between the center shaft 314 and the rotary sleeve 308. A magnetic seal is attached to the lower open end of the rotary sleeve 308 in order to prevent the leakage of the magnetic liquid 319. That is, a permanent magnet 320 is encased in a casing 321 which in turn is securely mounted on the rotary sleeve 308. An oil seal 322 is also attached to the lower open end of the magnetic seal.

The rotary sleeve 308 is fitted over the center shaft 314, whose one end is securely anchored to the lower housing 304, and the film of the lubricating oil or magnetic liquid is formed between the rotary sleeve 308 and the center shaft 314. The rotary sleeve 308 is driven by the direct-drive motor. Therefore, the present invention has succeeded in attaining the rotation with a higher degree of accuracy based upon the characteristics of the axial lubrication.

An axial bearing is provided between the center shaft 314 and the rotary sleeve 308 and radially inwardly of the upper and lower cylinders 301 and the rotor 312 and stator 311 of the direct-drive motor. This axial bearing may build up the pressure sufficient to carry the radial load. The axial bearing may eliminate the dead space between the ball bearings 204 and 205 (See FIG. 14), whereby the rotary head cylinder assembly may be made very compact in size.

The important features of the construction of the fourth embodiment are as follows:

(1) The axial bearing is formed in the inner wall surface of the rotary sleeve 308. The upper end of the cylindrical bore of the rotary sleeve 308 into which is inserted the center shaft 314 is sealed as described elsewhere.

(2) The micro-groove bearing 318 is provided at the top of the flange 317 extended from the free or upper end of the center shaft 314. It is this micro-groove bearing 318 that controls the axial position or height of the head 302 mounted on the upper cylinder 301.

(3) The upper cylinder 301 is mounted on the rotary sleeve 308.

(4) The lower end of the rotary sleeve 308 is drivingly connected to the direct-drive motor which is a driving means.

Because of (1), the complete sealing or containment of the lubricant or magnetic liquid 319 may be attained. Because of (3), the upper cylinder 301 may be removed upwards from the assembly in a very simple manner in order to exchange the worn-out head 302 with a new one. The head 302 is subjected to wear over a long period of operation.

The above features (1) through (4) must be taken into consideration as the fundamental requirements in the future designs of the VTR rotary head cylinder assemblies.

The rotary head cylinder assembly shown in FIG. 15 uses the micro-groove bearing 6 and the spiral-groove bearing 13 described in detail with reference to FIG. 7.

Figure 16:
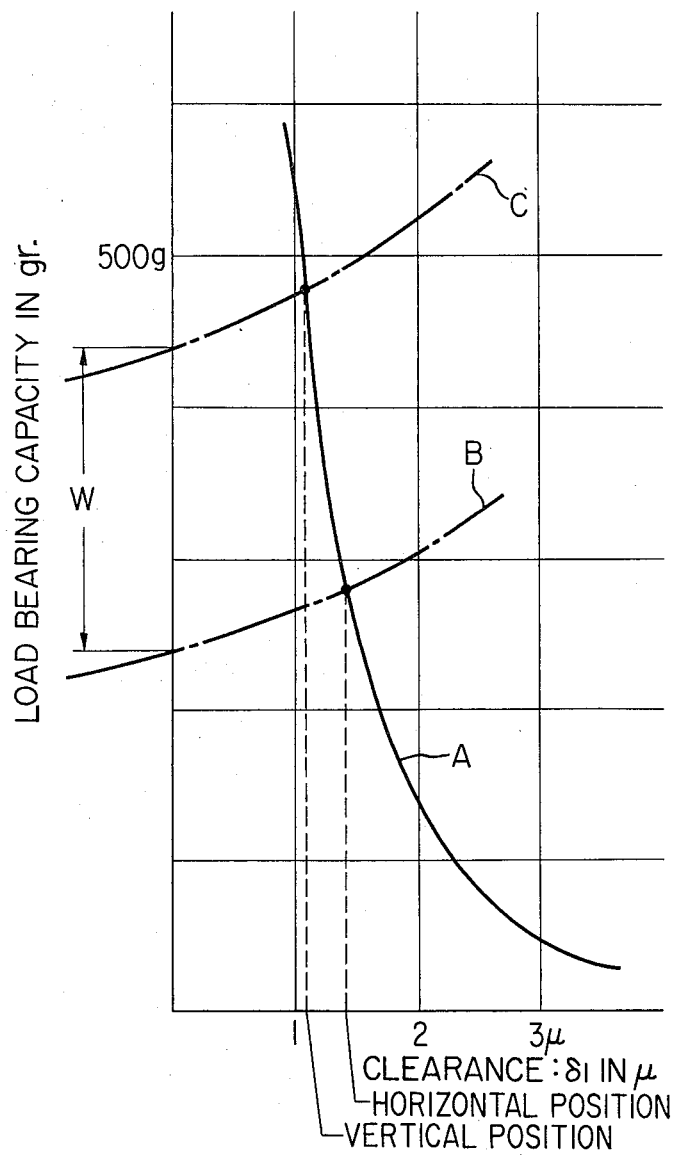
FIG. 16 shows the axial load vs. clearance characteristics of the fourth embodiment shown in FIG. 15.

Next referring to FIG. 16, the equilibrium state of the upper cylinder 301 when VTR is either a horizontal or vertical position will be described. The pressure vs. clearance characteristic curve A is of the micro-groove bearing whose dimensional data are shown in Table 1, but the weight of the rotating member is 200 grams not 250 grams.

The curve B shows the axial force which is in equilibrium with the pressure built-up by the micro-groove bearing 318 when the VTR is in the horizontal position. The axial force varies depending upon the clearance of the spiral-groove bearing 325. The inclination of the curve B is opposite to that of the curve A because the smaller the clearance ($\delta_1$), the greater the clearance ($\delta_2$) becomes, and vice versa. In the tests, the spiral-groove bearing 325 was so designed that when the clearance ($\delta_2$) is 30 microns, the load $f_2$ becomes 280 grams.

Therefore, in the horizontal position, the equilibrium point is the point at which the curves A and B intersect. At this point, the clearance ($\delta_1$) is 1.4 microns.

The curve C shows the force or load which is in equilibrium with the pressure built-up by the micro-groove bearing 318; that is, $f_2$ (the pressure built-up by the spiral groove bearing 325) plus the weight (200 grams) of the rotating member consisting of the upper cylinder 301, the rotary sleeve 308 and so on. With the VTR in the vertical position, therefore, the rotating member is in an equilibrium state, leaving the clearance ($\delta$) of 1.1 microns.

Thus, with the VTR rotary head cylinder assembly of the present invention, the position error between the horizontal and vertical positions is $$\Delta = 1.4 - 1.1 = 0.3 \text{ microns}$$

which is within the position error limit imposed upon the home-use VTRs which is not only portable but also capable of a long recording as described many times hereinbefore.

In general, the portable VTR is operated in a position between the horizontal and vertical positions. When the present invention is applied to the rotary head cylinder assembly for the portable VTR, the position error of the head is very small as described above so that the stable operation of the portable VTR may be ensured regardless of its position.

The diameter (d) of the micro-groove bearing 318 which is substantially equal to that of the projection 326 so that when the rotary head cylinder assembly is at rest in vertical position, the area and diameter of the intersurface between the micro-groove bearing 318 and its opposing bearing surface, that is, the undersurface of the cover 309, are small so that only a low starting torque is needed to start the rotating member. In addition, the height ($\delta_3$) (See FIG. 4) of the projection 326 is sufficiently high so that a low driving torque is needed to drive the rotating member. Therefore, the rotary head cylinder assembly, in accordance with the present invention, is particularly adapted for use in the portable VTR which must use a small size direct-drive motor.

As described above, the clearance between the micro-groove bearing 318 and its opposing bearing surface may be maintained at such a very small value, as from 1.1 to 1.4 microns, so that the head 302 may be located accurately at a predetermined position relative to the reference surface S in a very simple manner in the assembly because of the following features. (I) Since one end of the center shaft 314 is clamped to the base or the lower housing 304, the relative position of the shaft 314 with respect to the reference surface S (See also FIG. 17) remains unchanged even after the assembly. (II) Upon rotation of the rotating member, the pressure builtup by the micro-groove bearing 318 formed at the upper end or flange of the center shaft 314 causes the rotating member to float, but the lift above the micro-groove bearing 318 is very small as described above, the axial position or height of the head 302 may be maintained at a higher degree of accuracy in operation when the distance or height of the upper end or flange of the center shaft from the reference surface S is precisely determined and maintained in the assembly.

Next, the steps for assembling the VTR rotary head cylinder assembly of the type described above will be described below.

Figure 17:
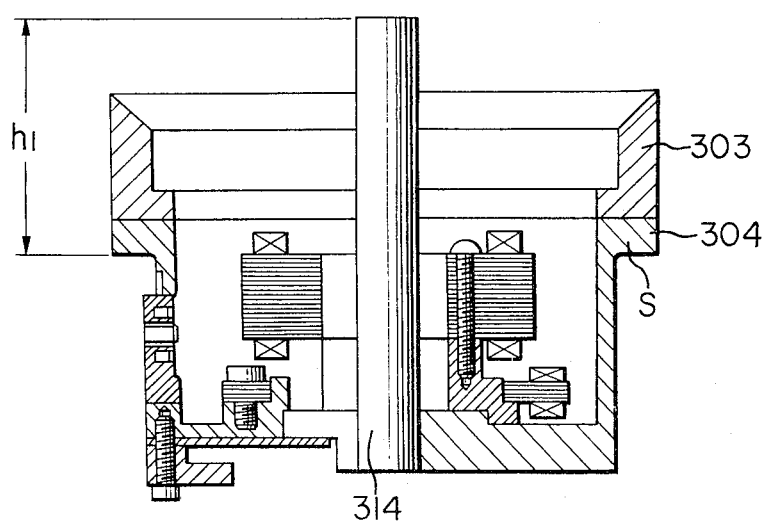
FIGS. 17, 18 and 19 are views used for the explanation of the steps for assemblying the VTR rotary head cylinder assembly shown in FIG. 15.

As shown in FIG. 17, the center shaft 314 is shrinkage fitted into the lower housing 304. Thereafter, both the ends of the center shaft 314 are firmly clamped so that the reference surface S may be machined in such a way that a desired degree of squareness between the center shaft 314 and the reference surface S and a desired height $h_1$ of the upper end of the center shaft 314 relative to the reference surface S may be obtained.

The rotary head cylinder assembly of the type described in detail above with reference to FIG. 15, is applied to the portable VTR capable of a long recording as described above so that all the parts must be machined and assembled at higher degree of dimensional accuracies. For instance, the error of squareness between the center shaft 314 and the reference surface S must be less than two microns, and the error of the height $h_1$, less than five microns. If the center shaft 314 is inclined at an angle relative to the reference surface S, the tape (not shown) cannot maintain a predetermined azimuth angle with respect to the head 302 and will be deviated from the predetermined track which has been considerably reduced in width as compared with the conventional VTR system in order to attain a long recording time.

Figure 18:
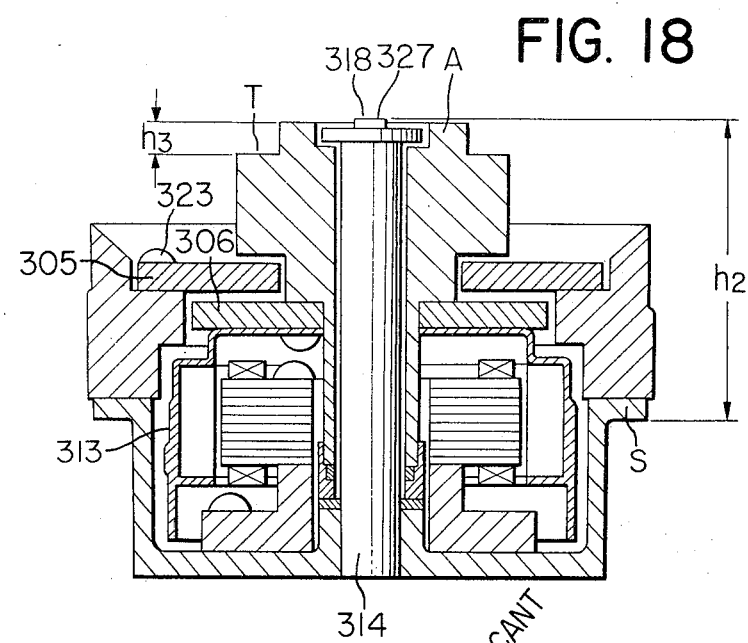

Next, the rotary transformer 305 and the magnet casing 313 are mounted on the rotary sleeve 308 which in turn is fitted over the center shaft 314 from the above in such a way that the rotary transformer 306 may be interposed between the rotary transformer 305 and the rotary sleeve 308. Thereafter, the rotary transformer 306 is securely joined to the lower cylinder 303 with the bolt 323. Thereafter, the flange 317 is securely joined to the upper or free end of the center shaft 314 as shown in FIG. 18.

Next, the distance $h_2$ between the reference surface S and the upper surface of the micro-groove bearing 318 is measured to check whether the distance is within an allowable tolerance.

The surface of the micro-groove bearing 318 is used as a thrust control surface 327 which determines the relative deviation (for instance, H shown in FIG. 15) in the axial direction between the rotating member consisting of the upper cylinder 301, the rotary sleeve 308, the rotary transformer 305, the rotor magnet 312 and the magnet housing 313 and the stationary member during the rotation of the rotating member.

Figure 19:
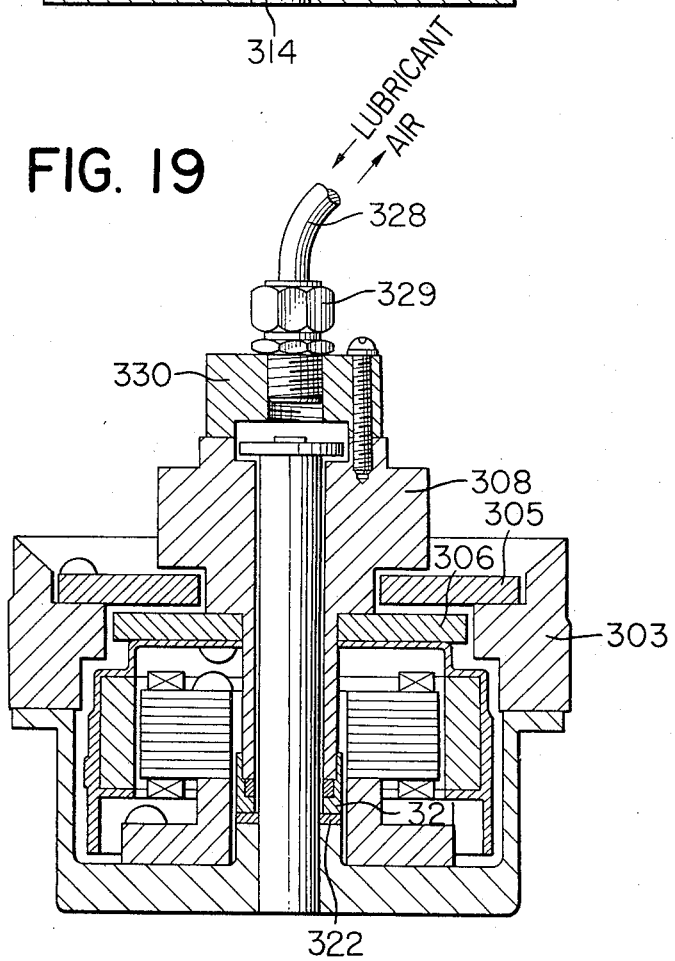

Next, referring to FIG. 19, the step for filling and sealing the magnetic liquid 319, which is a lubricant, will be described. The upper end of the rotary sleeve 308 is liquid-tightly sealed with a sealing cover or block 330 communicated through a coupling 329 with a pipe 328 which in turn is communicated with a source (not shown) of magnetic liquid 319. The rotary sleeve 308 is so lowered that the lower end of the permanent magnet casing 321 at the lower end of the rotary sleeve 308 may be brought into very intimate contact with the oil seal 322. Thereafter, the air is evacuated from the sealed space between the rotary cylinder 308 and the center shaft 314 so that the magnetic liquid 319 is filled into the space. After the space is completely filled with the magnetic liquid 319, the cover 309 (See FIG. 15) is attached to seal the magnetic liquid 319.

As described many times hereinbefore, when the ball bearings are used, the head 302 cannot be maintained accurately at a predetermined position because of the axial plays of the ball bearings which are indeterminable even when other parts are machined with desired degrees of dimensional accuracies. Therefore, as described hereinbefore, some sub-assemblies must be machined or otherwise finished again in order to attain the desired dimensional accuracies.

However, according to the present invention, when the parts are machined to the desired dimensional accuracies, the head 302 may be maintained at a predetermined axial position within a predetermined position error range during the rotation of the rotating member.

For instance, the VTR rotary head cylinder assembly of the type shown in FIG. 15 must satisfy the dimensional tolerances or accuracies shown in Table 2 below in order to maintain accurately the head 302 at a predetermined position.

TABLE 2

| Items | Symbols | Tolerances |
|---|---|---|
| distance between the reference surface S and the surface of the micro-groove bearing 318 | $h_2$ | less than 2.0 microns |
| variation in thickness of the oil film built-up by the micro-groove bearing 318 | $\Delta\delta_1$ | less than 0.5 microns |
| the distance between the surface A (See FIG. 18) of the rotating sleeve 308 upon which is mounted the cover 309 and the surface T thereof upon which is mounted the upper cylinder 301 | $h_3$ | less than 1.5 microns |
| the distance between the surface T and the head 302 | $h_4$ | less than 2.0 microns |

The VTR rotary head cylinder assembly of the present invention fabricated for the purpose of the tests, satisfied all the tolerances described above.

In assembly, the distance $h_2$ between the surface of the micro-groove bearing 318 and the reference surface S may be measured very simply when the reference surface S is clamped by the jigs in the same way as it is set to the VTR set.

Since the micro-groove bearing 318 has a very small surface area and is formed coaxially of the center shaft 314, the control on the distance $h_2$ relative to the reference surface S is very simple. Furthermore even when the projection 326 or the micro-groove bearing 318 is extended from the undersurface of the cover 309 while the flange 317 has a flat upper surface as will be described hereinafter, it suffices to measure as the distance $h_2$, the distance between the upper end or the upper surface of the flange 317 of the center shaft 314 and the reference surface S because the pressure is built-up only at the area where the micro-groove pattern is formed.

It should be noted that according to the present invention even when undulations are left in the cylindrical peripheral surface of the flange 317, they will not cause any effects on the float $\delta_2$ or the height $h_2$.

In addition, even when the viscosity of the magnetic liquid 319, which is a lubricant, changes as the environmental temperature changes, the variation in the thickness of the oil film built-up by the micro-groove bearing 318 may be maintained within the tolerance $\Delta\delta_1$ (See Table 2) because the oil film is extremely thin in thickness.

Both the mounting surfaces A and T (See FIG. 18) of the rotating sleeve 308 are oriented in the same direction so that the distance $h_3$ between them may be measured with the use of, for instance, a reference gage during the machining. As a consequence, it becomes very simple to machine them with desired degrees of dimensional accuracies.

As described elsewhere, instead of providing the micro-groove bearing 318 at the upper end of the center shaft 314 or more precisely at the upper surface of the flange 317 attached thereto, it may be extended from the undersurface of the cover 309.

As described hereinbefore, the thrust control surface 327 is a very important place in determining the axial position (H in FIG. 15) of the head during the rotation of the rotating member. In the modifications of the present invention such as those as shown in FIGS. 7 through 11, the thrust control surface 327 may be determined.

For instance, in the axial bearing of the type shown in FIG. 9, the surface adjacent to the center hole 20 is the thrust control surface 327. The correct distance or height H of the head relative to the reference surface S may be maintained when the distance or height $h_2$ between the thrust control surface 327 and the reference surface S is accurately determined and maintained during the assembly.

In the axial bearing of the type shown in FIG. 10, the thrust control surface 327 is the top or vertex of the semispherical projection 23 of the micro-groove bearing so that it suffices to measure the height or distance of the top or vertex from the reference surface S.

In the axial bearing with the construction as shown in FIG. 11, the thrust control surface 327 which controls the height of the head 302 is the top or vertex of the spherical projection or the like 28 having the micro-groove pattern 27.

The axial bearing constructions in accordance with the present invention are all provided with a thrust bearing (for instance, the herringbone type spiral-groove bearing) which builds up the pressure which acts in the direction opposite to that of the pressure built-up by the micro-groove bearing 318. The spiral-groove bearing has been so far described as being formed in the lower surface of the flange, but it is to be understood that a spiral-groove bearing may be formed at any suitable part of the rotary sleeve 308 such as at an intermediate and the lower open end. Furthermore, the micro-groove pattern may be directly formed in the upper end face of the center shaft 314.

When the VTR rotary head cylinder assembly employs the axial bearing construction of the present invention in which a sleeve, upon which is mounted an upper cylinder, is fitted over a center shaft whose one end is clamped to a base, whereby axial bearings are provided, one of said axial bearings being micro-groove bearing formed at the upper or free end face of said center shaft in such a way that the pressure built-up in the oil film produced by the micro-groove bearing may cause a rotating member consisting of the rotary sleeve, the upper cylinder mounted thereon and a head mounted on the upper cylinder to float upon rotation thereof, the VTR rotary head cylinder assembly may attain various effects, features and advantages to be described below.

(1) The VTR rotary head cylinder assemblies may be fabricated through the very simple assembly steps involving no step for machining or otherwise finishing the sub-assemblies. Furthermore, the head may be maintained accurately at a predetermined position or height during operation.

(2) The position error or the deviation of the position or height of the head may be minimized or made negligible regardless of the position of the VTR rotary head cylinder assembly.

(3) The rotating member may be started and driven at low torques.

(4) The error of the position of the head may be eliminated even after a long period of operation.

Furthermore, the magnetic liquid or lubricant may be sealed without any leakage over a long period of operation. In addition, the VTR rotary head cylinder assemblies may be made very compact in size to such an extent hitherto unattainable by the prior art.

So far, the present invention has been described in conjunction with the rotary mechanism in which a sleeve or a housing is fitted over a stationary shaft for rotation thereabout, but it is to be understood that even, though not shown, the present invention may be equally applied to a rotary mechanism in which a shaft is fitted into a stationary sleeve for rotation therein.

So far the present invention has been described as using as a lubricant a lubricating oil or magnetic liquid, but it is to be understood that the present invention may be equally applied to various bearings wherein air is used as a lubricant.

What is claimed is:

1. A rotary mechanism with axial bearing means characterized by the provision of
(a) a shaft having at least one free end;
(b) a housing rotatably fitted over said shaft with a lubricant interposed therebetween;
(c) a first axial position control means comprising a first thrust axial bearing means comprising
   a projection extended from the free end of said shaft or from the opposing bearing surface of said housing in opposed relationship with said free end of said shaft and functioning in such a manner that the clearance between the end face of said projection and its opposing bearing surface tends to be increased, and grooves formed from the radially inner side to the radially outer side in said end face of said projection or said opposing bearing surface of said housing; and
(d) a second axial position control means which is so designed and constructed that the force may be produced which tends to reduce the clearance between said projection and its opposing bearing surface.

2. A rotary mechanism with axial bearing means as set forth in claim 1 wherein
the pattern of said grooves on said first axial position control means is such that said lubricant may be force to flow radially inwardly toward the axis of said shaft.

3. A rotary mechanism with axial bearing means as set forth in claim 1 wherein said grooves function to increase the pressure of the lubricant in said clearance, said shaft has a flange, and said second axial position control means is a second thrust axial bearing means comprising grooves formed in a second surface of said flange remote from said free end of said shaft and opposite to a first surface thereof closer to said free end of said shaft or in the opposing bearing surface of said housing in opposed relationship with said second surface of said flange of said shaft.

4. A rotary mechanism with axial bearing means as set forth in claim 3 wherein said grooves of said second axial position control means is such that each groove consists of a radially inner groove portion and a radially outer groove portion contiguous with said radially inner groove portion, said radially inner groove portion being so oriented that said lubricant may be forced to flow said lubricant radially outwardly while said radially outer groove portion being so oriented that said lubricant may be forced to flow said lubricant radially inwardly.

5. A rotary mechanism with axial bearing means as set forth in claim 1 wherein said flange is extended from said free end of said shaft.

6. A rotary mechanism with axial bearing means as set forth in claim 1 wherein said second axial position control means comprises a magnet or magnets mounted on said shaft and/or said housing.

7. A rotary mechanism with axial bearing means as set forth in claim 6 wherein said magnets of said second axial position control means consist of magnets of a rotor or a stator of a motor which drives either said shaft or said housing relative to each other.

8. A rotary mechanism with axial bearing means as set forth in claim 1 wherein a magnetic head is mounted on either of said shaft or said housing, whereby a rotary head assembly may be provided;

a stationary cylinder having a cylindrical peripheral surface coaxial with said shaft is mounted on said housing or said shaft; and a drive means is provided for driving either of said shaft or said housing relative to each other.

* * * * *